UNITED STATES PATENT OFFICE.

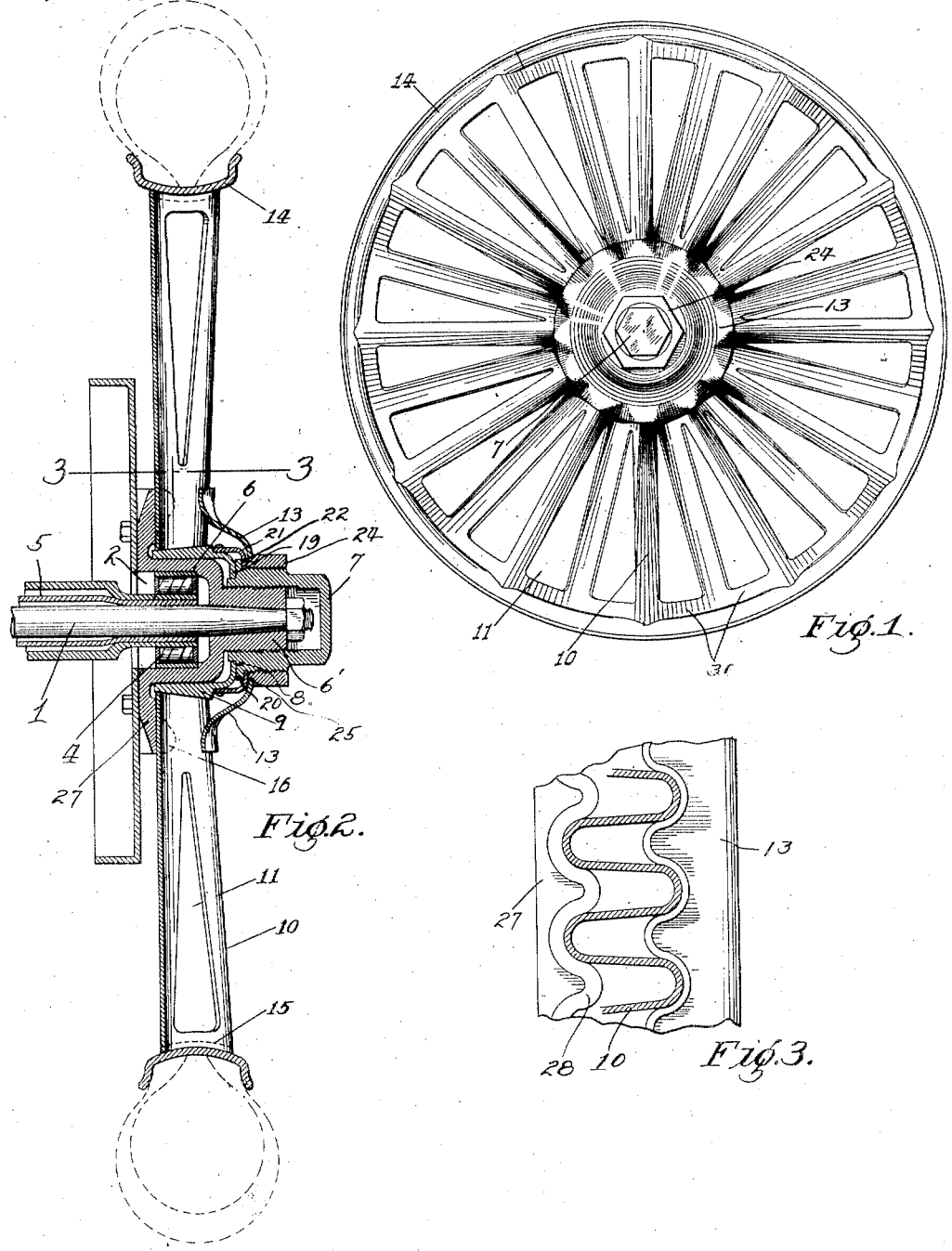

ALVIN H. SHOEMAKER, OF OAKLAND, CALIFORNIA, ASSIGNOR TO INTERNATIONAL STEEL WHEEL COMPANY, A CORPORATION OF WASHINGTON.

VEHICLE-WHEEL.

1,372,983.   Specification of Letters Patent.   Patented Mar. 29, 1921.

Application filed February 15, 1918, Serial No. 218,608. Renewed February 24, 1920. Serial No. 360,764.

*To all whom it may concern:*

Be it known that I, ALVIN H. SHOEMAKER, a citizen of the United States, residing at Oakland, in the county of Alameda and State of California, have invented certain new and useful Improvements in Vehicle-Wheels, of which the following is a specification.

This invention relates to improvements in vehicle wheels and more particularly to a new and novel structure for connecting the hub and rim.

The principal object of the present invention is to provide improved means for rendering the vehicle rim demountable. This object is accomplished by providing a corrugated web between the hub and rim which is circumferentially expansible, and which coöperates with the inside of the rim to hold the latter in place. Another object of the invention is to so arrange the hub structure that the web is expanded and contracted by the use of a single nut.

A further object of the invention is to form the web in such a manner as to provide the greatest possible strength therein with the least possible weight, the strength being uniformly disposed from the hub to the rim.

With these and other objects in view, the invention consists of certain novel features of construction combinations and arrangements of parts hereinafter described and more specifically pointed out in the append ed claims; it being understood that changes in form, proportion, size and minor details of construction within the scope of the claims may be resorted to without departing from the spirit of the invention or sacrificing any of the advantages thereof.

Referring to the drawings forming a part of the specification,

Figure 1, is a view in side elevation of a vehicle wheel showing my invention embodied therein.

Fig. 2, is a sectional view taken through the axis of the wheel.

Fig. 3, is a view in section on the line 3—3, Fig. 2.

Referring to corresponding parts in the several views by the same numerals of reference, 1 denotes the axle of the vehicle and 2 denotes in general the hub structure which is driven thereby. As here illustrated this structure is of the type commonly designated as "full-floating", the hub structure being keyed to the end of the axle and supported on the end of the axle housing 5, through the roller bearing 4.

The hub consists of the cylindrical portion 6 from which extends the coaxial portion 6' that is externally threaded and engaged by the hub cap 7. The latter has an annular shoulder 8 adjacent the open end, while the opposite end is hexagonal for engagement with a suitable wrench.

Slidably mounted on the cylindrical hub portion 6 is an annular ring 9 the peripheral face of which is conical and which is provided at one end with the inwardly extending flange 19 that is adapted to abut against the shoulder 8. The hub cap is also provided with a radial flange 20 extending outwardly from the shoulder 8. A ring 21 is fastened on the outside of ring 9 and this ring has an inwardly extending flanged portion 22 which engages flange 20 on the face opposite shoulder 8. In this way the conical member 9 is constrained to move axially when the hub cap is turned.

The web or spoke structure 10 of my wheel which forms the principal part of the invention is bent from a single sheet of metal and consists of a series of radial corrugations. These corrugations adjacent the hub, are curved almost at an angle of 180° while adjacent the rim or the outer periphery, adjacent corrugations make a lesser angle with each other. In each corrugation are provided cut-out portions 11 which are substantially triangular in shape, the point being adjacent the hub where the greatest strength is required and the base being adjacent the rim where the disk contains the greater amount of metal and where the least bending stress takes place.

The manner of corrugating the disk is such that strength is secured where needed for the deep substantially parallel-sided corrugation adjacent the hub giving the greatest reinforcement at this point.

The center of the corrugated web formed as above described is provided with a tapering opening that is adapted to seat on the conical outer surface of ring 9 while the outer periphery of the web is curved or provided with a concave groove that is adapted to engage a similarly shaped convex surface on the inner periphery of the rim 14.

On the outside cylindrical surface of the hub cap 7 is provided screw threads that are adapted to be engaged by a nut 24 this nut being provided with an annular shoulder 25 which engages a disk 13, the outer edge of which is curved to engage the corrugations of the disk 10.

The hub is also provided with a radial flange 27 the outer edge of which is provided with corrugations that are adapted to co-act with the corrugations of the web 10, these corrugations being of such shape that they form the drive connection between the hub and web 10.

In use the corrugated disk 10 is placed over the hub 6 and the small end of ring 9 is engaged in the central opening of the disk. At the same time the interior threaded portion of the hub cap engages the threaded portion of the hub so that when the hub cap is turned on to these threads, the conical ring is forced into the opening of the corrugated disk thereby expanding the latter. This expansion takes place due to the fact that the metal of the disk bends parallel to the corrugations and equally around the periphery so that the periphery is forced against the inside of the vehicle rim 14.

When the outer edge of the corrugations comes in contact with the rim and seats tightly thereon, the rim itself acts as a tie to the outer edge of the disk and the whole becomes very rigid. It will be noted that the disk is formed so that one face is in a plane at right angles to the axis of rotation while the other side is concave as viewed from the outside. This construction not only is mechanically correct to resist the outward thrust exerted by the axle, but is also that which the metal of the disk will assume without any stretching.

Now, to remove the rim 14 and tire carried thereby, it is only necessary to slightly slacken off the nut 24 and then to turn the hub cap until the conical ring 9 is moved from under the central opening of disk 10. This allows the latter to contract until the outer edge takes the position shown in dotted outlines at 15, enabling the rim to be slipped off laterally and a new one placed in position.

All the spokes or uncut portions of the disk adjacent the ground are stressed when there is an axial thrust exerted against the center of the wheel. This is the case even though alternate spokes are on opposite sides of the convex portion of the rim because the stress is carried across the latter through the connecting parts 30.

While I have shown the preferred embodiment of my invention, it will be understood that changes within the scope of the claims may be made in minor features of design and construction.

I claim as new and wish to cover by Letters Patent:

1. A vehicle wheel, comprising in combination with a rim and hub structure, a single piece expansible disk extending between said hub and said rim, and means carried by said hub for expanding said disk against said rim.

2. A vehicle wheel, comprising in combination with a rim and hub structure, a single piece corrugated disk extending between said hub and said rim, and means carried by said hub for expanding said disk against said rim.

3. A vehicle wheel comprising a hub, a rim, a single piece radially corrugated disk extending between said hub and said rim, and means embodied in said hub for circumferentially expanding said disk.

4. A vehicle wheel comprising a hub structure, a radially corrugated single piece disk carried by said hub, means embodied in said hub for circumferentially expanding said disk, a rim carried by the outer periphery of said disk, said rim and said disk having a cooperating groove and abutment to hold said rim on said disk when the latter is expanded.

5. A vehicle wheel comprising a hub, a rim, a disk extending between said rim and said hub and rim, radial corrugations formed in said disk having a greater depth at the periphery thereof than adjacent the center, means embodied in said hub for circumferentially expanding said disk, a driving connection between said hub and said disk, said disk having a groove formed circumferentially around the outer edge thereof, and means on said rim for cooperating with said groove when said disk is expanded.

6. A wheel comprising a rim and a center having interlocking engagement operable by a relative radial movement, and means for expanding and contracting the center to engage and release the rim and center.

7. A wheel comprising a rim and a center having interlocking engagement operable by relative radial movement, a hub cone and means for forcing said cone into the center, to thereby expand it and secure it to the rim.

8. A wheel having a rim and a center having interlocking engagement by relative radial movement, the center being expandible peripherally, and means for peripherally expanding said center by radially expanding it at its hub.

In testimony whereof I affix my signature.

ALVIN H. SHOEMAKER.